May 14, 1929.  R. F. NORRIS  1,712,516
ELECTRICAL MEASURING DEVICE
Filed Oct. 15, 1927
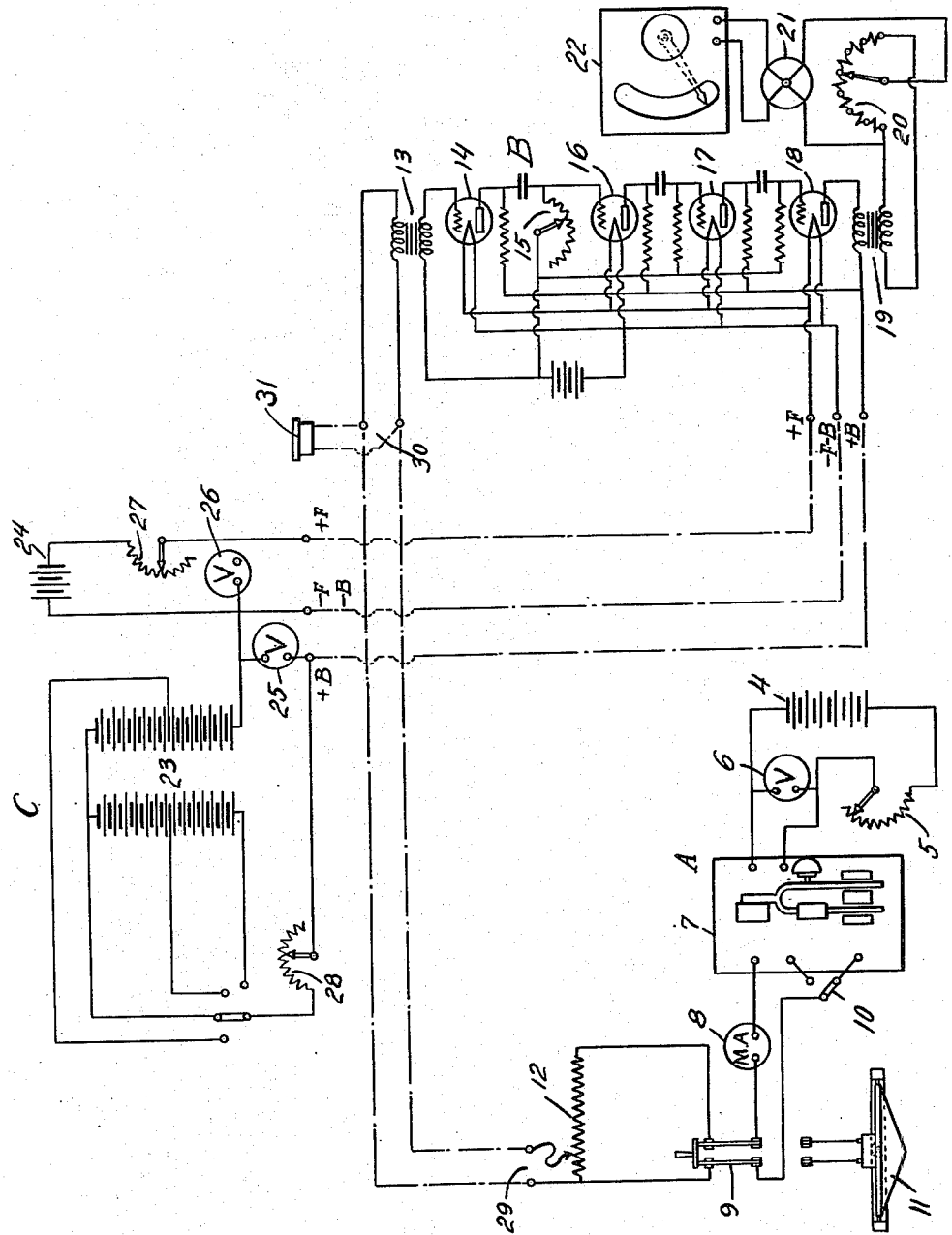
INVENTOR
Ralph F. Norris
BY
Pennie, Davis, Marvin & Edmonds
ATTORNEYS Patented May 14, 1929.

1,712,516

UNITED STATES PATENT OFFICE.

RALPH FORBUSH NORRIS, OF MADISON, WISCONSIN, ASSIGNOR TO C. F. BURGESS LABORATORIES, INC., OF MADISON, WISCONSIN, A CORPORATION OF DELAWARE.

ELECTRICAL MEASURING DEVICE.

Original application filed December 10, 1926, Serial No. 154,018. Divided and this application filed October 15, 1927. Serial No. 226,411.

This invention relates to electrical measuring devices and is a division of my copending application, Serial Number 154,018, filed December 10th, 1926.

An object of my invention is the provision of means for emitting sounds of known acoustical power in combination with a current-measuring device by means of which the current employed to emit the sound may be measured and the sound prevailing at a fixed point may also be translated into electric current and measured.

A further object of my invention is to provide a simple, accurate and efficient apparatus for scientifically studying sound transmission, acoustics of rooms, sound-absorbing qualities of materials, and especially those materials used for interior walls, and further to provide a simple means for measuring the intensity of sound. It is a still further object of my invention to provide means for quickly calibrating the acoustometer so that accurate readings may be quickly made.

In practicing the process I employ novel apparatus to produce sounds of known acoustic powers by means of an electrically operated tuning fork and a loud speaker, and I provide calibratable means for measuring their effect in rooms. The average absorbing value of the surfaces of a room may thus be readily determined from these measurements. Having determined the average absorbing value of a room its acoustics may be changed to produce desired effects by the addition or subtraction of absorbing material. The sound resistance of a wall or other structure may also be measured by placing the sound producer on one side of the wall and the sound meter on the opposite side. The reading obtained on the meter is proportional to the intensity of sound transmitted by the wall.

At the present time two methods are used for measuring the reverberation of rooms. In the first method, all exposed areas and the volume of the room are carefully measured. The absorption coefficients of the surfaces are determined by reference to data prepared by Professor W. C. Sabine of Harvard University. The areas of the various surfaces are then multiplied by their respective sound absorption coefficients. The results obtained together with the volume of the room may be substituted in the formula: $\frac{.05 V = T}{a}$, where $V$ = volume, $a$ = absorption, and $T$ = time of reverberation. This method is tedious and inaccurate due to the practical impossibility of accurately determining the actual areas of the various materials exposed and the impossibility of obtaining coefficients for every type of surface.

In the second method a calibrated organ pipe is placed in the room to be tested and sound emitted therefrom and abruptly stopped. The time necessary for the sound to die out is determined by means of the ear and a stop-watch. While this method gives the period of sound decay directly, it is open to the objection that the ear of the observer must be calibrated and must always be assumed to be the same.

My novel apparatus eliminates the undesirable features of these methods. In addition to being accurate, it is easily transportable. In short, it combines the facility of the second method with extreme simplicity, portability and freedom from variable human elements and it also allows of the direct measurement of acoustic transmission coefficients of any given material. My novel apparatus consists of three units, a sound producer, a sound meter, and a battery box conveniently arranged to operate the sound meter.

The accompanying drawing represents diagrammatically the three units of apparatus with the connections between the units shown in dotted lines.

Referring to the drawing, the sound producer A is connected to the sound meter B which is in turn connected to the battery box C.

The sound reproducer A comprises a battery 4, a rheostat 5, a voltmeter 6, an oscillator 7 (an electrically operated tuning fork producing electrical waves of an approximate sinusoidal form), a milliameter 8, a double-pole double-throw switch 9, a single-pole double-throw switch 10, a loud speaker 11 and means (not shown) for rotating or otherwise moving the loud speaker. A calibrative circuit 12 comprising a potential-dividing device is connected to one set of contacts of the switch 9, and the loud speaker to the other set of contacts.

The sound meter B comprises a sound-frequency amplifier including an input transformer 13, which controls the grid of a tri-electrode thermionic valve or vacuum tube 14, which is coupled by a resistance through a capacity to vacuum tube 16 having a variable grid leak resistance 15, by which the input tube 16 may be controlled, thus controlling the sensitivity of the whole amplifier in a manner well known to those skilled in the art. The three vacuum tubes 16, 17 and 18 are coupled by resistances through capacities according to standard practice. More tubes may be added if desired. The output of tube 18 is coupled through a step-down transformer 19, to an audibility meter 20, having a number of ratio points. The output of the audibility meter is fed as alternating current to thermal-couple 21 which it heats, the heating of the couple causing it to generate a direct current proportional to the incoming alternating current. This direct current is measured by a suitable meter 22.

The battery box C comprises 90 volts of "B" battery 23, and 4½ volts of "A" battery 24, with appropriate volt-meters 25 and 26, and rheostats 27 and 28 to properly control the currents to the sound meter B.

Before being used to measure sound-absorbing effects, the apparatus must be calibrated as follows: First, with the sound-absorbing power of the surface of the room known, the oscillator is connected to the sound producer, and a sound emitted. This sound is picked up by the magnetophone 31, amplified in the sound meter B and a reading secured upon meter 22. The milliameter 8 is adjusted to a current value which produces energy at the input of sound meter B, which is satisfactory for purposes of operation. Amplification of the sound meter B is adjusted so that a reading somewhere near mid-scale is obtained on meter 22. The switch 9 is then changed from the sound producer 11 to the potentiometer 12 and pick-up device 31 disconnected at terminals 30. The movable contact of the potentiometer is then adjusted so that without changing the adjustment of the amplifier in sound meter B the same reading is secured upon meter 22 as was previously obtained. The instrument is then calibrated for any number of subsequent tests. The current supplied to the input transformer 13 of the amplifier is thus adjusted to be the same when it is supplied through potentiometer 12 as when supplied acoustically from sound producer 11 to pick-up device 31.

The method of operation to measure the sound-absorption of a room, for example, is as follows: The oscillator 7 of the sound producer A is actuated by means of battery 4 through rheostat 5, and then switch 9 is thrown to the calibrating circuit 12. Rheostat 5 is operated until a predetermined current is registered by meter 8. It is presumed that this current has already been determined, as above described, by calibrating the instrument in a room of which the sound-absorbing power is known. Terminals 29 of the calibration circuit 12 are then connected to terminals 30 of the sound meter B. The terminals of the battery box C are connected to like lettered terminals of the sound meter B. The filament and plate currents of vacuum tubes 14, 16, 17 and 18, are adjusted by rheostats 27 and 28 to their proper values as indicated by meters 25 and 26. The audibility meter 20 is set on a certain point which has been determined to be the correct one for calibrating the instrument; that is, meter 22 should read approximately at the center of the scale. Then variable resistance 15 is manipulated until the exact predetermined reading, preferably half scale, is shown by meter 22.

Since a current of known value is flowing in calibration circuit 12 of which a definite proportional part is impressed through connections 29 and 30 on the input of the sound meter, and the sound meter is adjusted so that meter 22 registers a definite current output, the sound meter is now standardized in sensitivity and may be disconnected from the calibration circuit at terminals 30.

An acoustometer-electrical device 31, such as a magnetophone or earphone, is connected to terminals 30 of the sound meter B as a sound pick-up. Switch 9 of the sound producer A is thrown to the speaker 11 which then emits a sound of a constant acoustical power and pitch. The speaker is started moving or rotating. This speaker should be moving in a way that crests or troughs of standing waves will be avoided, as will be further explained hereinafter. I have found that good results may be obtained with a speaker emitting sounds in a direction at an angle, preferably perpendicular, to an axis about which it is rotating. Two or more speakers may be used simultaneously and these may rotate about axes mounted at different angles. The movement of the speaker is an important element of my invention. This sound is thrown into the room under measurement and a component of the sound together with its reflections are received by the magnetophone 31 and are recorded through the calibrated sound meter by meter 22. Since the sound-producing loud speaker is rotating on an axis perpendicular to the direction of sound projection, the sound at any one point will approximate the average of that in the room, and the possibility of mislocating the sound pick-up at the crest or trough of a standing wave due to interference between reflected waves is reduced to a minimum. The lag of the sound meter furthermore tends to give average readings where there may be fluctuations in sound absorption.

The reading recorded by the sound meter is a measure of the intensity to which a sustained sound of the acoustical power of that generated by the sound producer will rise in that particular room and is inversely proportional to the total absorption of the room. The relation is expressed by the equation:

$$E = \frac{4W}{VS},$$

where E is the reading of the sound meter, W is the acoustical power of the sound producer, V is the velocity of sound in feet per second at the room temperature, S is the total absorbing power of the room and its furnishings. W may be determined from the above equation by taking a sound meter reading, then adding sound-absorption material of known value to the room and taking a new reading. Simple calculations will give the acoustical power of the sound producer. To find the period of reverberation in seconds, the value of S is found as above and is substituted, together with the volume of the room in cubic feet, in the formula:

$$T = \frac{.05V}{S}.$$

The sound-absorption value of any material may be measured by introducing it into a room of known absorbing value and making measurements in a manner similar to those previously described.

In measuring the sound transmitted through partitions the sound producer is operated on one side of the partition and the sound meter and pickup are placed on the opposite side. The readings are directly proportional to the intensity of the sound transmitted. If in these tests it is desirable to use a sound of different intensity the switch 10 on the oscillator may be thrown to a different point. Of course, any suitable source of sound other than that herein described may be employed. The sound meter B may be used to determine the absorbing qualities of a given material by comparing the results obtained on meter 22 with the results obtained when an absorbing material of known value is used.

Throughout the specification and claims the word "room" is used in its generic sense to indicate any inclosure.

I claim:

1. The method of measuring the comparative intensity of a sound emitted from a speaker to that portion of said sound prevailing at any fixed point, which comprises measuring the intensity of sound impressed on an acousti-electrical device at said fixed point resulting from a measured oscillating current of known frequency impressed on said speaker, said acousti-electrical device being in combination with means for measuring the oscillating current produced in it, and comparing the current produced to the intensity of said oscillating current impressed on said speaker.

2. In an acoustometer, the combination of an oscillator and a current-measuring device with a calibrating circuit, including a potential-dividing device, which impresses a known current on the current-measuring device.

3. In an acoustometer, the combination of an oscillator, a current-measuring device, a calibrating circuit comprising a potential-dividing device, a speaker actuated by said oscillator and capable of moving in fixed paths, and means for disconnecting said calibrating circuit and substituting said speaker to impress on said speaker an oscillating current of the frequency and intensity impressed on said calibrating circuit.

4. The steps in the method of measuring the sound absorption of a room which comprise establishing an alternating current at sound frequency, adjusting the strength of said current in accordance with an arbitrary measurement thereof, producing sustained sound by means of said current, transforming said sound into alternating current, measuring said alternating current, and comparing the two measurements.

5. An acoustometer comprising an oscillator, a calibrating circuit connected to said oscillator, a speaker actuated by said oscillator and capable of moving in fixed paths, means for disconnecting said calibrating circuit and substituting said speaker, an amplifier, means for adjusting the effective amplification of said amplifier, an acousti-electrical device connected to the input side of said amplifier, a thermal-couple connected to the output side thereof, and a current-measuring device connected to said thermal-couple.

In testimony whereof I affix my signature.

RALPH FORBUSH NORRIS.

Certificate of Correction.

Patent No. 1,712,516.                                                          Granted May 14, 1929, to

RALPH FORBUSH NORRIS

It is hereby certified that error appears in the printed specification of the above numbered patent requiring correction as follows:

Page 1, line 55, in the formula, for $$\frac{.05\ V = T}{a} \quad \text{read} \quad \frac{.05\ V}{a} = T$$

and that the said Letters Patent should be read with this correction therein that the same may conform to the record of the case in the Patent Office.

Signed and sealed this 25th day of June, A. D. 1929.

[SEAL]                                                        M. J. MOORE,
*Acting Commissioner of Patents.*